United States Patent [19]
Hamilton

[11] 3,846,730
[45] Nov. 5, 1974

[54] PROPORTIONING MOISTURE SENSING DEVICE FOR REFRIGERATION SYSTEMS

[76] Inventor: Samuel L. Hamilton, 3800 N.W. 22nd Ave., Miami, Fla. 33142

[22] Filed: Mar. 12, 1973

[21] Appl. No.: 340,373

[52] U.S. Cl.................. 338/34, 62/129, 340/235
[51] Int. Cl............................................ H01c 13/00
[58] Field of Search ............ 338/34, 35; 200/61.04; 73/335, 336.5, 338; 340/235; 62/125, 126, 129

[56] References Cited
UNITED STATES PATENTS

| | | | |
|---|---|---|---|
| 2,976,728 | 3/1961 | Brogan et al. | 73/336.5 |
| 3,181,098 | 4/1965 | Richards | 338/34 |
| 3,671,912 | 6/1972 | LaSota | 338/34 |

Primary Examiner—C. L. Albritton
Attorney, Agent, or Firm—Clarence A. O'Brien; Harvey B. Jacobson

[57] ABSTRACT

A sensing device for detecting the presence of dissolved and undissolved water or water related contaminants in a refrigeration system even when the water or contaminants are present at low concentrations in order to activate an audio-visual signal, deactivate the system or otherwise provide a warning or corrective action before the occurrence of damage to the system. The device is in the form of a probe insertable into a flow line or flow path of a refrigeration system and includes an absorbent material positioned between and in intimate contact with an anode and cathode with constant pressure maintained on the anode and cathode for retaining these components in contact with the absorbent or desiccant.

10 Claims, 6 Drawing Figures

PROPORTIONING MOISTURE SENSING DEVICE FOR REFRIGERATION SYSTEMS

BACKGROUND OF THE INVENTION

1. Field of the Invention

The present invention generally relates to moisture sensing devices and more particularly a sensing device for use in refrigeration systems for detecting the presence of moisture or moisture related contaminants in the refrigeration system to enable corrective action to be taken prior to the occurrence of damage to the system.

2. Description of Prior Art

One of the major problems occurring in refrigeration systems is damage caused by moisture or water in the refrigeration system. Frequently, water, and water-related contaminants such as acids in the refrigerant liquid, gas, or oil will cause damage to various components of the refrigeration system and has been the cause of many major repairs. This problem has been recognized and some efforts have been made to detect contaminants in the refrigeration system. U.S. Pat. No. 3,288,960 issued Nov. 29, 1966 to E. J. Miller discloses electrical contacts in the flow path of a fluid to provide a warning or render the system inoperative when the quality or characteristics of the fluid in the flow path has changed. Other patents disclose electrical circuits in which absorbent members are associated with electrodes to control an electrical circuit in response to moisture absorbed by the absorbent. U.S. Pat. No. 3,671,912 issued June 20, 1972 to L. S. LaSota discloses an exemplary arrangement of this type. However, such prior devices perform after contact with undissolved contaminants such as moisture to dissolve a soluble material, acid to attack the twisted wires or water in insulating oil and do not solve the problem of detecting small quantities or concentrations of moisture and contaminants that may become absorbed in a refrigerant system which is necessary in order to sense a condition before it causes damage.

SUMMARY OF THE INVENTION

An object of the invention is to provide a proportional sensing device for detecting the presence of dissolved or undissolved moisture or moisture related contaminants in refrigeration systems before damage to the system occurs in which the device comprises a self-contained, relatively small and adjustable probe which can be inserted into a refrigeration system at various locations without requiring special fittings, openings and the like.

Another object of the invention is to provide a sensing device in the form of a probe including an anode and cathode with desiccant crystals, pellets, powder or any other hygroscopic material disposed therebetween which reacts to moisture and including a novel arrangement for maintaining substantial pressure contact of the anode and cathode with the desiccant absorbent material.

A further object of the invention is to provide a sensing device in accordance with the preceding object including a novel arrangement for retaining the desiccant material in an annular space between plate anodes and cathodes.

Still another object of the invention is to provide a sensing device which operates in hot and cold refrigerant liquid, gas, oil or air with the sensing device proportioning or changing its electrical flow characteristics in response to its ambient conditions.

Another essential object of the invention is to provide a sensing device which is extremely simple in construction, easy to install, adapted for use in various types of refrigeration systems and other fluid flow paths and effective for sensing ambient conditions and providing warning or corrective action.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

Figure 1:
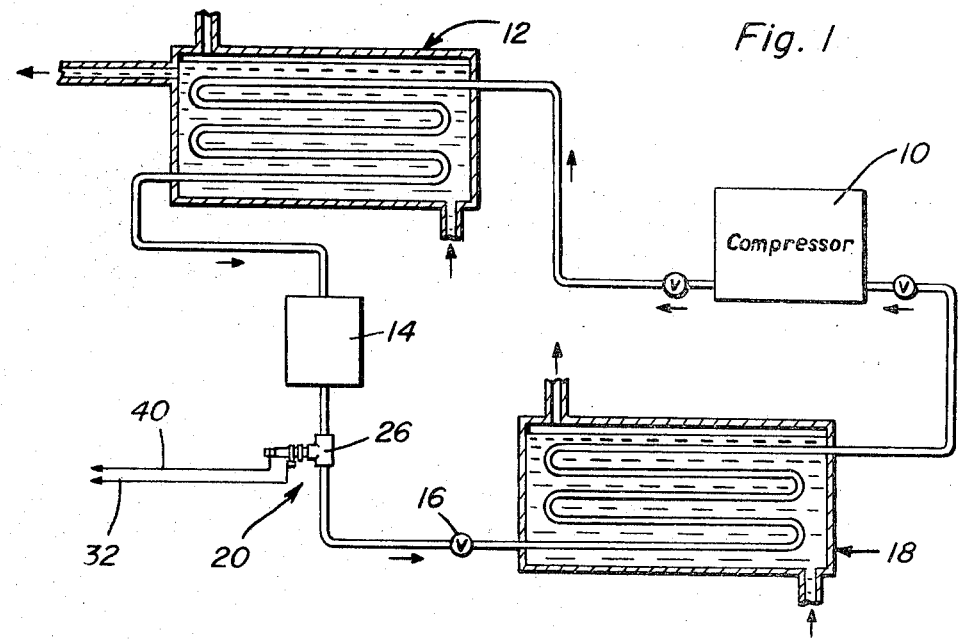
FIG. 1 is a schematic illustration of a refrigeration system with the sensing device of the present invention incorporated therein.

FIG. 1 illustrates schematically a standard refrigeration system including a compressor 10, water-cooled condenser 12, liquid refrigerant, dryer 14, expansion device 16 and evaporator assembly 18 which is shown as the type for chilling or cooling water or other liquid heat exchange medium. The proportional sensing device of the present invention is generally designated by the numeral 20 and is illustrated in the liquid refrigerant line between the receiver-dryer and expansion device. However, as set forth in more detail hereinafter, the sensing device may have many locations depending upon the particular refrigeration system involved. As illustrated, the sensing device may be incorporated into the refrigerant flow path 22 by insertion into the branch 24 of a standard T coupling 26.

Figure 2:
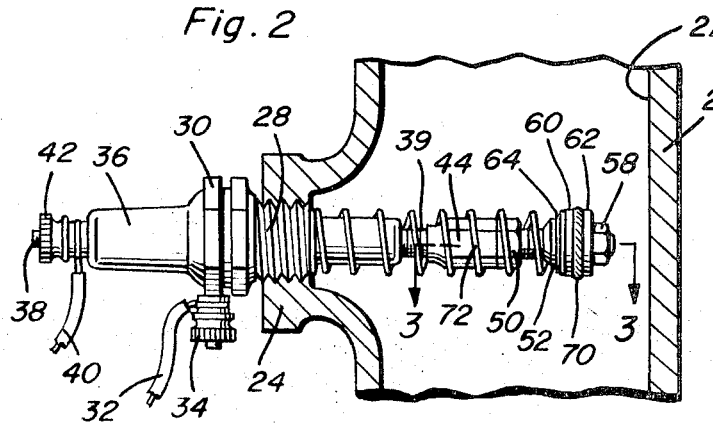
FIG. 2 is an elevational view of the sensing device installed in a flow line of the refrigeration system.
Figure 4:
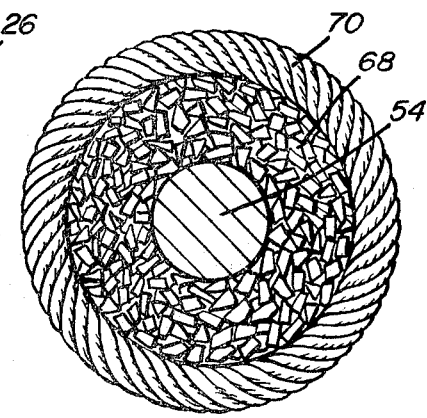
FIG. 4 is a transverse, sectional view taken substantially upon a plane passing along section line 4—4 of FIG. 3 illustrating further structural details of the absorbent material and retainer therefor.
Figure 3:
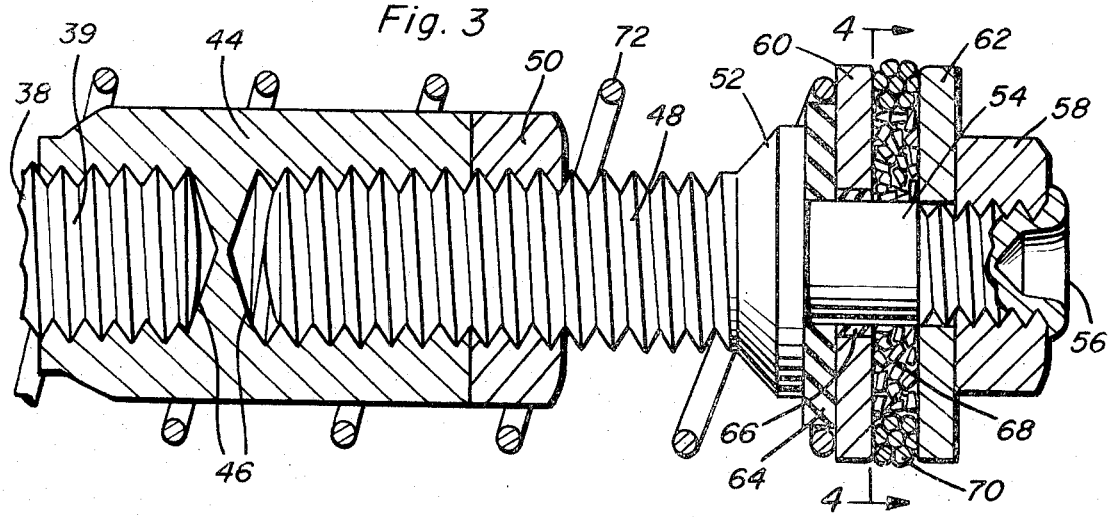
FIG. 3 is a longitudinal, sectional veiw, on an enlarged scale, taken substantially upon a plane passing along section line 3—3 of FIG. 2 illustrating the specific structural details of the probe, anode, cathode, absorbent material, retainer and related structure.

The sensing device 20 shown in FIGS. 2-4 includes a screw-threaded body 28 that is externally threaded and is detachably engaged with the internally threaded branch 24 of the coupling 26. The body 28 includes a polygonal wrench receiving area 30 to facilitate installation of the device. A cathode wire 32 is connected to the body 28 by a standard screw-type connection 34 so that the wire 32 is electrically connected to the body 28 which is of conductive material. The cathode wire 32 may be connected to any portion of a totally grounded refrigeration system with the connection to body 28 only being necessary when the probe assembly 20 is screwed into nonconducting material.

Disposed longitudinally through the body 28 which is provided with a cylindrical internal bore is an insulating sleeve 36 of porcelain, plastic or other suitable insulating material with the ends of the sleeve 36 extending both inwardly of the body 28 and outwardly thereof. Extending longitudinally through the insulating sleeve 36 is a conductor rod or electrode 38 which extends beyond each end of the insulating sleeve 36. The outer end of the electrode is connected to an electrical conductor 40 by a standard screw-type connection 42 thus electrically connecting the conductor 40 to the electrode 38 with the inner end of the electrode extending beyond the inner end of the insulating sleeve 36. Thus, the conductors 32 and 40 are insulated from each other and the conductive body 28 is insulated from the conductive rod or electrode 38.

The rod 38 is provided with a threaded end 39 which receives an adapter 44 having internal threaded bores 46 formed therein. The outer bore 46 threadedly receives an externally threaded rod 48 which enables variation in the length of the probe or depth of the probe by threading the rod 48 into and out of the threaded bore 46. A lock nut 50 is provided on the threaded rod 48 to lock it in adjusted position.

The threaded rod 48 includes a peripheral boss or shoulder 52 thereon and an axially extending rod 54 projecting therefrom in opposite relation to the threaded rod 48. The free end of the rod 54 is externally threaded at 56 for receiving a pressure adjusting and retaining nut 58. Positioned between the shoulder 52 and the nut 58 is a cathode disc 60 and an anode disc 62 with the anode disc 62 resting against the nut 58 and placed directly on the threaded rod 54. The cathode disc 60 is spaced from the shoulder 52 by an insulating disc 64 and insulated and spaced from the threaded rod 54 by an insulating sleeve 66 which may be integral with or separate from the disc 64 and constructed of plastic or other insulating material.

Interposed between the cathode disc 60 and the anode disc 62 is a layer of desiccant material 68 which is moisture absorbent and may be in particulate form such as granules or crystals of silica gel, or silica gel in pellet or powder form or any other hygroscopic material that changes its electrical characteristics with the absorption of moisture. The desiccant material 68 is retained in place between the discs 60 and 62 by a fabric ring or grommet 70 which has a cross-sectional area generally equal to the space between the discs 60 and 62 and forms an annular porous closure for the space between the discs 60 and 62 thereby retaining the desiccant material within the annular space defined by the discs 60 and 62 and by the external surface of the rod 54 and the internal surface of the annular fabric ring 70. The annular fabric ring 70 is of a porous fabric material which enables moisture or moisture contaminants to be absorbed by the desiccant material 68. The fabric ring 70 also serves as a strainer to prevent the desiccant material from becoming plugged by contaminants.

Electrical contact is made with the cathode disc 60 by a conductive coil compression spring 72 which has the end convolution thereof closely encircling the insulating disc 64 and in engagement with the surface of the cathode disc 60 in opposed relation to the fabric ring 70 and the absorbent material or desiccant material 68 so that the coil spring will be positioned with the convolutions thereof spaced from the rod or electrode 38 throughout the length thereof. The other end of the spring is engaged with the end of the body 28 disposed interiorly of the branch 24 of the coupling 26. Thus, the spring 72 serves as a cathode or electrical connector between the body 28 and the cathode disc 60 and is insulated from and spaced from the electrode 38. The spring serves to maintain a constant compressive force or pressure against the disc 60 thereby maintaining firm electrical contact between the disc 60 and body 28 in order to be certain to transmit even small conductivity changes of the silica gel. The nut 58 is provided for clamping engagement of the silica gel between the discs 60 and 62 and a free adjustment has been made, the threaded end 56 of the rod 54 may be riveted over thus locking the nut 58 in position.

Figure 5:
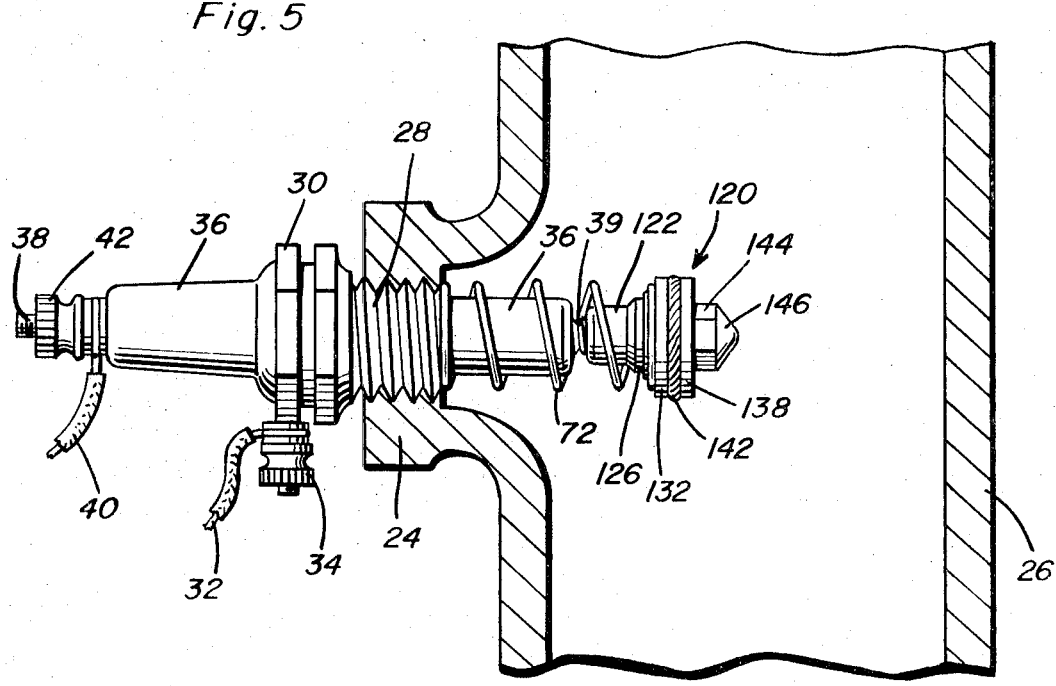
FIG. 5 is a sectional view similar to FIG. 2 illustrating another embodiment of the sensing device.
Figure 6:
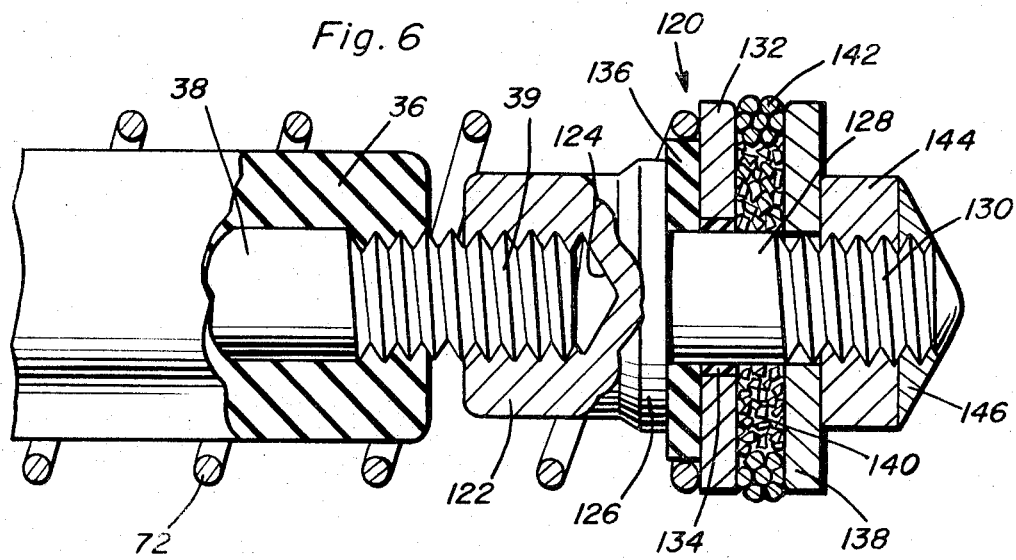
FIG. 6 is a sectional view illustrating the specific details of the embodiment of the device illustrated in FIG. 5.

FIGS. 5 and 6 of the drawings illustrate a modified form of the invention in which an alternate structure is employed. The adapter 44 illustrated in FIGS. 2 and 3 is removed and a sensing element 120 is attached directly to the externally threaded end portion 39 of the electrode 38. This arrangement provides for a reduction in length of the assembly so that the sensing element is oriented adjacent the portion of the pipe coupling 26 having the branch 24 therein. The structure of the probe externally of the coupling 26 is the same as that in FIGS. 2–4 and the same reference numerals are employed to designate these structural features.

The sensing element in FIGS. 5 and 6 includes a body 122 having an internally threaded bore 124 which is threaded onto the threaded end 39 of the electrode 38. The body 122 is provided with a shoulder 126 and an extending rod 128 having an externally threaded end portion 130. A cathode disc 132 is mounted on the rod 128 in insulated relation from the rod 128 by an insulating sleeve 134 and insulated from the flange or shoulder 126 by an insulating disc 136. An anode disc 138 is mounted on the rod 128 in opposed spaced relation to the cathode disc 132. Confined between the discs 132 and 138 is desiccant material 140 and a retaining ring 142 of porous fabric material. The structure of the discs 132 and 138 and the desiccant material and retaining ring therefor are substantially the same as the corresponding structure illustrated in FIGS. 2–5.

For applying pressure to the disc 138, a nut 144 is threaded onto the threaded end 130 of the anode rod 128. A locknut 146 is applied to the threaded end 130 externally of the nut 144 with the locknut and corresponding end of the threaded end 130 being ground off to substantially a shallow conical configuration as illustrated in FIG. 6 after the locknut 146 has been tightened. Originally, the locknut would be substantially the same polygonal shape and configuration as the nut 144 and after the nut 144 has been tightened, the locknut 146 is tightened after which the locknut and the threaded end 130 are ground to the shape and configuration illustrated in FIG. 6.

The clamping of the desiccant 68 or 140 between the two discs with substantial pressure is significant inasmuch as the pressure crushes the desiccant material to substantially a powder form. The fabric retaining ring also functions to hold the desiccant in place during the initial application of pressure and, of course, retains the loose powder resulting from assembly. In actual practice, most of the powder will stay in position without the retainer ring although the retainer ring of porous fabric does significantly reduce the plugging of the desiccant material due to the absorption of contaminant material from the refrigerant. The spring 72 serves to assure transmittal of current from disc 60 or 132 to the body or screw-threaded plug 28 and to compensate for any probe depth adjustment. Continuous substantial pressure is exerted on the desiccant by the clamp nut and locknut assembly and for practical application of the change in conductivity, an amplifying circuit is employed for controlling the refrigeration system.

While the device has been illustrated in association with a T coupling, it is pointed out that it may be associated with any type of pipe coupling or inserted into flow lines or flow paths of various configurations. For example, the assembly could be incorporated into a Y-strainer and can be associated with the flow path by using absorbent materials by which moisture or moisture related contaminants could be transmitted to the desiccant material by capillary action or the like. Other materials could be employed to retain the desiccant material in position as long as they are flexible, porous and nonconductive. The sensing device, when installed, will require only standard pipe fittings, bushings, reducing sleeves, nipples, couplings and the like. Also, while the sensing device has been illustrated in an elementary refrigeration circuit in FIG. 1 illustrating only one probe point, in more sophisticated refrigerant circuits, such as presently used hot gas reheat, hot gas defrost, reverse cycle, liquid injection motor compressor cooling systems and the like, the probe may be located at various locations, amplifier circuiting or the like may be employed and the sensing device or devices associated with the refrigerating system in such a manner to properly protect the system. The sensing device is operative in association with refrigerant liquids, cold liquids, cold gas and other phases of refrigeration systems.

One example of a typical installation is the incorporation of a conventional relay circuit to shut down the entire system with probe locations being selected for each individual installation depending upon the installation requirements of each system.

It is of significance in this invention that the sensing device not only will sense the presence of undissolved moisture but also detect abnormal dissolved contaminants thus detecting potential trouble before it starts and providing an audio-visual or mechanical corrective reaction. While fluorinated hydrocarbon refrigerants are manufactured under certain standards of moisture content, the ability to absorb and hold moisture varies with the temperature. It is possible that moisture content above the evaporator saturation may occur in the refrigerant from normal operation, gasket, evaporator and condenser tube leaks, etc., with such moisture totally absorbed in the liquid refrigerant by high temperature and released in the evaporator and carried through the compression cycle and then re-absorbed in the compression and condensing cycle, which condition generates acids and water related contaminants. In order to detect small quantities of moisture and contaminants which are absorbed in the refrigerant system thereby avoiding possible damage before it occurs, an absorbent has been used that is able to pick up moisture in extremely low concentrations and which changes its electrical characteristics as a result of the moisture absorption. In addition, firm contact is maintained between the anode, cathode and absorbent material in order to transmit small conductivity changes. This is accomplished in the present invention by employing discs, initial adjustment by the lock nut and fine adjustment of the probe depth with the entire unit being self-contained and completing an electrical circuit through the coil spring. Basic amplifier and relay arrangements may be employed depending upon the installation requirements and the device may be used to operate proportional motors, modulating control program proportioning switches or any other desired control apparatus. By calibrating a standard ohmmeter in a humidity scale, direct humidity readings can be achieved by inserting into ducts or the like in order to maintain control of the humidity conditions therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sensing device for detecting the presence of low concentrations of moisture and moisture related contaminants in refrigerant systems comprising an anode and cathode disposed in spaced relation in the flow path of the refrigerant system and adapted to be connected into an electrical circuit, absorbent means disposed between the anode and cathode and in the flow path with the absorbent means including material capable of change of electrical conductivity in response to moisture absorption including dissolved and undissolved moisture and moisture related contaminants in the refrigerant system whereby changes of conductivity will enable electrical flow in the circuit for enabling detection of the presence of moisture or moisture related contaminants in the refrigerant system.

2. The structure as defined in claim 1 wherein said anode and cathode are in the form of discs insulated from each other, said absorbent means being in the form of desiccant material between the discs, means moving the discs towards each other for pressure contact with the desiccant material, an annular retaining member encircling the desiccant material at the outer periphery of the discs for retaining the material between the discs, said retaining member being in the form of a porous fabric ring to enable transmission of moisture to the desiccant material.

3. The structure as defined in claim 2 wherein said anode and cathode discs are carried at the inner end of a probe including an insulating sleeve, an inner electrode connected to the anode and an outer conductive body operatively associated with the cathode for completing the electrical circuit to the cathode, and spring means including a metallic coil spring in contact with and between the body and cathode for completing the circuit therebetween.

4. The structure as defined in claim 3 wherein the length of the electrode may be varied thereby varying the position of the anode with variation in such position being compensated for by the spring thereby enabling adjustment of the position of the anode and cathode.

5. The structure as defined in claim 1 wherein said anode and cathode are in the form of spaced plates spaced from each other by desiccant material, means maintaining contact pressure between the plates and desiccant material thereby maintaining electrical contact with changes in electrical conductivity of the desiccant material being proportional to absorption of moisture or moisture related contaminants from the refrigerant system.

6. The structure as defined in claim 5 wherein said desiccant material is in particulate form, and porous means disposed peripherally of the desiccant material to retain it between said plates.

7. The structure as defined in claim 5 wherein said desiccant material includes silica gel in particulate form, and a porous fabric annular member disposed between and engaged by said plates, said annular member being disposed outwardly of the desiccant material to retain it between the plates while enabling contact between the desiccant material and ambient conditions in the flow path.

8. A device for detecting the presence of foreign material in a region subject to contamination by such material comprising a pair of spaced conductive members disposed in said region and adapted to be operatively connected to an electrical circuit, and absorbent means disposed between said members and controlling electrical conductivity therebetween, said absorbent means being in the form of desiccant material capable of absorbing the foreign material and changing its electrical conductivity proportional to the quantity of foreign material absorbed for indicating proportionately the presence of foreign material, said conductive members being in the form of plates, means, for moving the plates toward each other for pressure contact with the desiccant material, and means supporting said plates in said region, said desiccant material being in particulate form, and a flexible porous member encircling the desiccant material between the plates for confining the material, said means for moving the plates towards each other including a conductive spring means engaged between one of said plates and the electrical circuit, and means engaging the other of said plates to enable adjustment of contact pressure of the plates against the desiccant material.

9. The structure as defined in claim 8 wherein said plates are in the form of circular disks, said flexible porous member being in the form of a fabric ring having an external diameter generally equal to the external diameter of the plates to form a seal between the plates for retaining the desiccant material but enabling passage of the foreign material to the desiccant material, said means engaging the other of said plates to enable adjustment of contact pressure including a screw threaded rod and nut assembly with the rod being connected to the electrical circuit and insulated from the conductive spring means and the plate engaged by the conductive spring means.

10. A device for detecting the presence of moisture in a refrigeration system comprising an anode and cathode adapted to be connected to an electrical circuit and being disposed in spaced relation to each other and disposed in a flow path in the refrigeration system with the refrigerant in the flow path defining an ambient region for the anode and cathode, particulate moisture absorbent material disposed between and in contact with the anode and cathode, said absorbent material being capable of change in electrical conductivity proportional to its ambient moisture conditions thereby defining a reversible variable resistor changing its electrical resistance proportionately to its ambient moisture conditions, and a porous flexible member disposed peripherally of the absorbent material and extending between the anode and cathode to retain the absorbent material between the anode and cathode and moisture sensing communication between the absorbent material and the ambient moisture conditions in the flow path.

* * * * *